(12) United States Patent
Trimberger

(10) Patent No.: US 8,176,461 B1
(45) Date of Patent: May 8, 2012

(54) DESIGN-SPECIFIC PERFORMANCE SPECIFICATION BASED ON A YIELD FOR PROGRAMMABLE INTEGRATED CIRCUITS

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 207 days.

(21) Appl. No.: 12/776,934

(22) Filed: May 10, 2010

(51) Int. Cl.
*G06F 17/50* (2006.01)

(52) U.S. Cl. ........ 716/134; 716/113; 716/121; 716/128; 703/19

(58) Field of Classification Search .................. 716/113, 716/121, 128, 134; 703/19
See application file for complete search history.

(56) References Cited

U.S. PATENT DOCUMENTS

| | | | | |
|---|---|---|---|---|
| 5,636,372 | A * | 6/1997 | Hathaway et al. | 713/500 |
| 5,886,900 | A * | 3/1999 | Gascoyne et al. | 716/103 |
| 5,910,899 | A * | 6/1999 | Barrientos | 716/118 |
| 7,100,134 | B2 * | 8/2006 | Wu et al. | 716/52 |
| 7,149,991 | B2 * | 12/2006 | Kovacs-Birkas et al. | 716/104 |
| 7,149,999 | B2 * | 12/2006 | Kahng et al. | 716/53 |
| 7,152,217 | B1 * | 12/2006 | Srinivasan | 716/113 |
| 7,197,728 | B2 * | 3/2007 | Yonezawa | 716/56 |
| 7,239,997 | B2 * | 7/2007 | Yonezawa | 703/19 |
| 7,469,394 | B1 * | 12/2008 | Hutton et al. | 716/113 |
| 7,474,999 | B2 * | 1/2009 | Scheffer | 703/14 |
| 7,487,474 | B2 * | 2/2009 | Ciplickas et al. | 716/135 |
| 7,739,630 | B1 * | 6/2010 | Chen et al. | 716/136 |
| 7,913,214 | B2 * | 3/2011 | Yamada | 716/113 |
| 7,921,402 | B2 * | 4/2011 | He | 716/136 |
| 8,037,430 | B2 * | 10/2011 | Papanikolaou et al. | 716/56 |
| 2007/0266356 | A1 * | 11/2007 | Chang et al. | 716/6 |

OTHER PUBLICATIONS

U.S. Appl. No. 12/480,488, filed Jun. 8, 2009, Lesea et al.

* cited by examiner

*Primary Examiner* — Naum Levin
(74) *Attorney, Agent, or Firm* — LeRoy D. Maunu; Lois D. Cartier

(57) ABSTRACT

A method for generating a design-specific timing specification includes inputting a first timing specification of a target device corresponding to a first timing yield. The first timing specification contains timing delays of elements located in at least first and second regions of the target device. A circuit design is placed and routed. With a programmed processor, the timing delay of the first timing specification is increased for one or more elements implementing the circuit design in the first region to produce a second timing specification, and a second timing yield of target device is determined from the second timing specification. In response to the second timing yield being larger than a target timing yield, the programmed processor decreases the timing delay of the second timing specification for one or more elements in the second region to compensate for a difference between the second timing yield and the target timing yield to produce a design-specific timing specification.

15 Claims, 8 Drawing Sheets

DESIGN-SPECIFIC PERFORMANCE SPECIFICATION BASED ON A YIELD FOR PROGRAMMABLE INTEGRATED CIRCUITS

FIELD OF THE INVENTION

The embodiments of the present invention generally relate to determining timing specifications for designs to be implemented on programmable integrated circuits.

BACKGROUND

The minimum dimension that a given photolithography process can resolve is alternatively called the minimum feature size or the critical dimension. The feature size is a parameter of interest as reductions in the feature size tend to improve speed performance of the IC. The feature size of a printed integrated circuit (IC) is not uniform. The printing process results in slight variation of the feature size from lot-to-lot, from wafer-to-wafer, and from device to device within each wafer. As a result, programmable ICs, such as field programmable gate arrays (FPGAs) and other programmable logic devices, may experience variations in static power and circuit delay due to variations in the manufacturing process.

As circuit designs continue to increase the speed and power efficiency requirements of target devices, it is increasingly important for developers to simulate and test circuit designs on target devices using precise power and delay specifications prior to realization. Many programmable IC vendors, such as Xilinx, Inc., measure switching speed of several printed devices of a product design to determine a voltage or delay specification that can be guaranteed to designers. This is referred to as a timing specification. The timing specification is sometimes referred to as a speedfile or a performance guarantee, and such terms are used interchangeably herein.

Switching speed is not uniform throughout a particular die or from die-to-die. Some manufacturing variations may consistently result in circuit elements in different regions of a die having different switching speeds. These types of variations are referred to as systematic variations. Other manufacturing variations are unpredictable and are characterized as random variations. Random variations may cause variation between dies for a particular location. Random variations may be due to lithography, masking or some other process required in the manufacturing of the integrated circuit devices. Systematic variations may be accurately represented and accounted for by an average of measured delay values at various locations on the die. In contrast, random variations result in a wider distribution of measurements for each location that are gathered from a large number of dies. Random variations may not be accurately represented by a mean of measured values.

Due to the measured differences between devices caused by random variations in the die, the average delay measurements must be de-rated. The timing data for the slowest elements in the slowest die is used to characterize the devices. However, such a characterization may be unduly pessimistic and may not accurately reflect the speed of the device. The percentage of devices that do not violate the guaranteed delays indicated by a timing specification is known as a timing yield. Because conventional timing characterization methods do not account for the fact that certain resources of a device may be consistently faster than others due to systematic variation, conventional speed characterization methods lead to pessimistic resource delay specifications.

Due to random type variations in the die from device to device, in order for the guaranteed specification to apply to a majority of the devices, the parameters of the specification are offset to include a certain amount of headroom above the average. The offset of a timing specification is typically chosen for a particular timing yield to be guaranteed by a vendor and is important to delivering high-quality devices as well as for maintaining low cost for devices. The particular timing yield is also referred to as the target timing yield or selected timing yield, and such terms are used interchangeably herein. For example, measurements may indicate that the majority of product devices can operate on average at or above 110 megahertz (MHz) at 1V operating voltage, but a small percentage of the devices will operate as low as 102 MHz at the same voltage. The specification may offset an average speed of 110 MHz by a headroom of 10 MHz to ensure that an acceptable percentage of devices perform as indicated in the specification. The presence of process variations degrades the performance and power specifications that manufacturers can guarantee to customers. The larger the amount of random variation, the larger the specification is offset by a headroom. Because of the included headroom, many printed devices in a product design are capable of performing with better voltage and delay parameters than those guaranteed in the vendor product specification.

The present invention may address one or more of the above issues.

SUMMARY

In one embodiment, a method is provided for determining a design-specific timing specification for elements of a target device. A placed-and-routed circuit design for a target device and a timing specification of delays for elements in different regions of the target device are input. An expected timing yield corresponding to the timing specification for a plurality of the target device is input. The expected timing yield is a first proportion of a total number of the plurality of the target device having all elements that satisfy the timing specification. With a programmed processor, a design-specific timing yield is determined for the placed-and-routed circuit design as a function of amounts by which the delays of the timing specification are less than required delays of paths of the design. The design-specific timing yield is an expected second proportion of a total number of the plurality of the target device that, when configured with the circuit design, have all elements satisfying the timing specification. A path of the circuit design that uses elements in a first one of the regions is selected. Respective delays of a first set of one or more elements in the timing specification are reduced by respective amounts that maintain the design-specific timing yield at a level greater than or equal to the expected timing yield to produce a design-specific timing specification. The one or more timing elements are located on the selected path in the first region.

In another embodiment, the selecting of a path of the circuit design that is in the first one of the regions includes: determining one or more critical paths of the circuit design; and selecting one of the one or more critical paths of the circuit design that is in the first one of the regions.

In another embodiment, respective delays of a second set of one or more elements in the timing specification are increased. The increase in the respective delays of the second set of one or more elements compensates for a reduction in the design-specific timing yield resulting from the reduction in delays of the first set of one or more elements. The second set of one or more elements is located in a second region of the target device.

In another embodiment, the second set of one or more elements is located on non-critical paths of the circuit design.

In another embodiment, the circuit design is not placed on elements included in the second set of one or more elements.

In another embodiment, a method is provided for generating a design-specific timing specification. A first timing specification of a target device corresponding to a first timing yield is input. The first timing specification contains timing delays of elements located in a plurality of regions of the target device, including at least a first region and a second region. A placed and routed circuit design is input. With a programmed processor the timing delay of the first timing specification is increased for one or more elements implementing the circuit design in the first region to produce a second timing specification. Using the programmed processor, a second timing yield of the target device is determined from the second timing specification. In response to the second timing yield being larger than a target timing yield, the programmed processor decreases the timing delay of the second timing specification for one or more elements in the second region to compensate for a difference between the second timing yield and the target timing yield to produce a design-specific timing specification.

In another embodiment, a critical path of the circuit design is determined. The second region includes all regions of the plurality of regions which include the critical path.

In another embodiment, maximum operable timing delays are determined for elements of the placed and routed circuit design in the first region. Amounts of delay indicated by the maximum operable timing delays of elements in the first region in excess of delays of corresponding elements in the first timing specification are determined. The increasing of the timing delay of the first timing specification increases the timing delay by an amount equal to the excess of the timing delays. In another embodiment, the decreasing of the timing delay of the one or more elements of the second timing specification includes decreasing the timing delay for one or more elements implementing the circuit design in the second region by an amount less than or equal to the excess of delays.

In another embodiment, the determining of maximum operable timing delays of elements of the placed and routed circuit design includes performing timing analysis on the circuit design.

In another embodiment, a maximum timing yield adjustment corresponding to the amount of delay in excess of delays of corresponding elements in the first timing specification is determined. The timing delay of the first timing specification in the first region is increased by an amount less than or equal to an amount corresponding to the maximum timing yield adjustment to produce the second timing specification.

In another embodiment, the one or more elements in the first region are located on non-critical paths of the circuit design.

In another embodiment, the circuit design is not placed on the one or more elements in the first region.

In another embodiment, a method is provided for generating a design specific timing specification. Two or more timing specifications of a target device and a circuit design are input, each timing specification indicating delay parameters of elements of the target device. Timing analysis of the circuit design is performed with a programmed processor for each of the two or more timing specifications to determine respective performance values. Using the programmed processor the timing specification of the two of more timing specifications having the highest performance value is determined.

In another embodiment, the circuit design is respectively placed and routed for each of the two or more timing specifications.

In another embodiment, the placing and routing of the circuit design includes performing timing analysis optimizations.

In another embodiment, timing requirements of the circuit design are determined. The determining of the timing specification having the highest performance value includes determining the timing specification of the two of more timing specifications having the highest performance value and meeting the timing requirements of the circuit design.

In another embodiment, the timing specifications indicate timing data for a plurality of regions of the target device.

In another embodiment, the cumulative delay parameters of each timing specification corresponds to a common timing yield.

In another embodiment, the cumulative delay parameters of each timing specification corresponds to a respective timing yield that exceeds a target timing yield.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION

Timing specifications are commonly provided by vendors for programmable integrated circuits (ICs). Developers use the timing specifications to simulate performance of designs on various target ICs and to determine whether the programmable ICs meet requirements of those designs. Conventional timing specifications may not take variations of delay parameters or requirements of the design into account when creating a timing specification that guarantees a specific timing yield. As a consequence, the timing specifications may indicate overly pessimistic performance parameters in one or more regions of a device. The described embodiments allocate performance headroom in different areas according to the requirements of a specific design, and generate a custom timing specification having a selected overall timing yield for the design. This may allow a vendor of a programmable IC to promise better performance for a specified timing yield, or may allow a developer to implement a design using a cheaper programmable IC than would be guaranteed by the conventional timing specifications.

Figure 1:
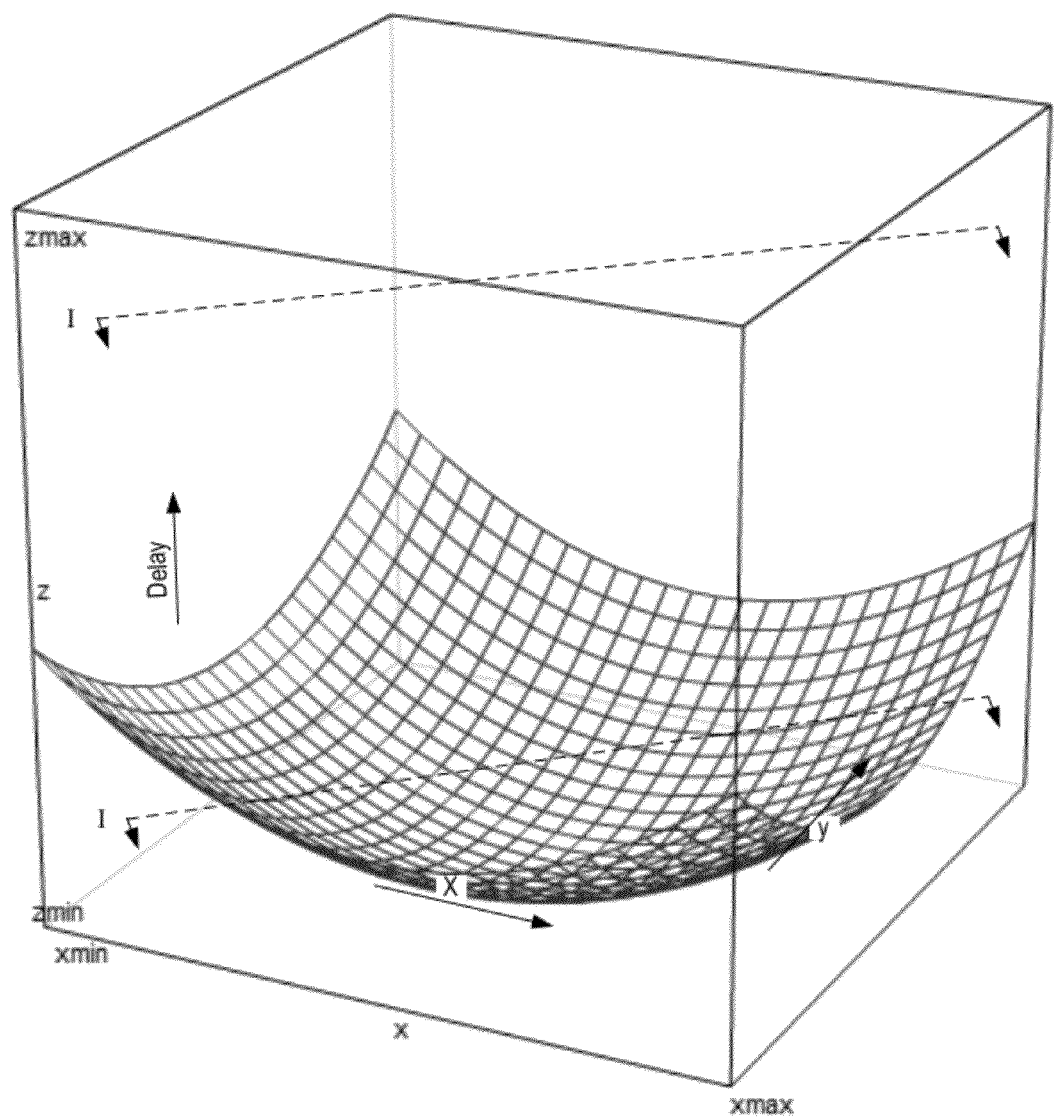
FIG. 1 illustrates a generalization of timing performance of an example semiconductor die.

FIG. 1 shows a graph of generalized delay parameters for a particular type of circuit element across an example IC die. As shown, the performance or delay of identical circuit elements may vary depending on location on the die. The delay value in each location of the die is determined from measurements of a large number of dies. Measurements may be obtained by probing a number of dies following assembly to determine delay values. In a field programmable gate array (FPGA), for example, measurements may also be obtained by configuring several logic blocks to implement built-in-self-test (GIST) ring oscillators that depend on the logic block delay called TILO. These ring oscillators are commonly called TILO rings. When operated, the switching speed of transistors implementing the TILO rings can be determined from the frequency at which the TILO rings oscillate. One skilled in the art will recognize that a number of other methods may be used to measure delay parameters as well.

In the example shown in FIG. 1, elements located in the center of the die are indicated as operating with lower delay, and elements located on the edges and corners are indicated as operating with higher delays. In this example, a three-dimensional graph shows delay values measured across a two-dimensional die surface. One skilled in the art will recognize that any number of dimensions may be used to represent the performance parameters mapped across various dimensions of a die. For ease of explanation, speed files are primarily described herein in terms of a corner-to-corner cross section of two dimensions of a die as shown by cross-section I in FIG. 1. The curves in FIG. 1 are exemplary, and in practice the performance curve may be rough and irregular.

Figure 2:
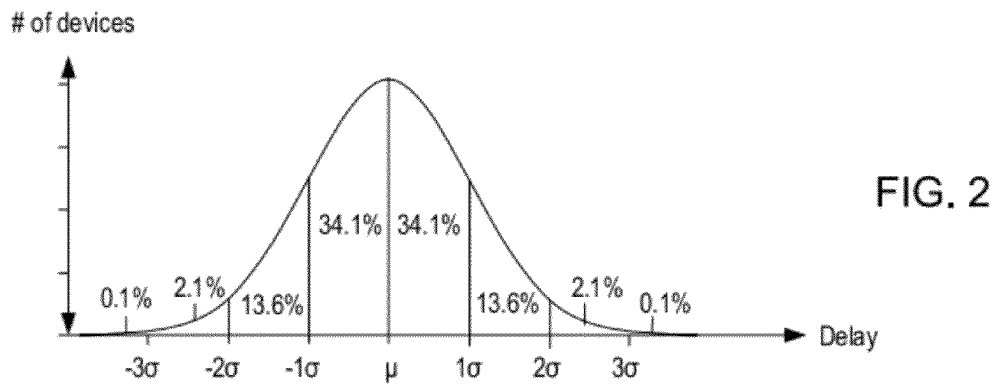
FIG. 2 illustrates a normal distribution curve of measured delay values for a particular location of a semiconductor die.

In a typical dataset of delay measurements from a particular area of a number of dies, the measured delay parameters will vary from die to die. This variation is due to process variations in the manufacture of circuit elements of the different dies. FIG. 2 illustrates a distribution curve of an example data set of delay measurements. The distribution curve indicates how the measured devices are distributed across the range of measured delay values. The distribution of data points within the range are typically described in terms of the standard deviation (a) units in relation to the mean (μ) value. The deviation of a delay measurement in the data set is the difference between the delay measurement and the mean, variance is the mean of squared deviations of the delay measurements, and the standard deviation is the square root of the variance.

The distribution curve illustrates the relationship between the offset from the mean that will be used as the timing specification and the corresponding timing yield. For example, if the mean is used as the timing specification delay value, the timing specification will have a timing yield with 50.0 percent of devices less than the indicated delay value. If headroom of one σ is added to the mean, the timing yield increases to 84.1 percent (50+34.1) of the devices.

In this example, a data set is shown as having a normal distribution. This yields a curve known as the "bell curve." Although for ease of illustration the examples herein are primarily described in terms of a normal distribution, one skilled in the art will recognize that the distribution of measured delay values need not follow the normal distribution. Percentages and quantities discussed in relation to different thresholds of standards of deviation are included for illustrative purposes only and may not be representative of a real life distribution.

Table 1 shows example timing yields corresponding to several guaranteed delay value offsets in a normal distribution curve.

TABLE 1

| Offset | Timing yield |
|---|---|
| μ | 50% |
| 1σ | 84.1% |
| 2σ | 97.72% |
| 3σ | 99.865% |
| 4σ | 99.996% |
| 5σ | 99.9999% |

Figure 3:
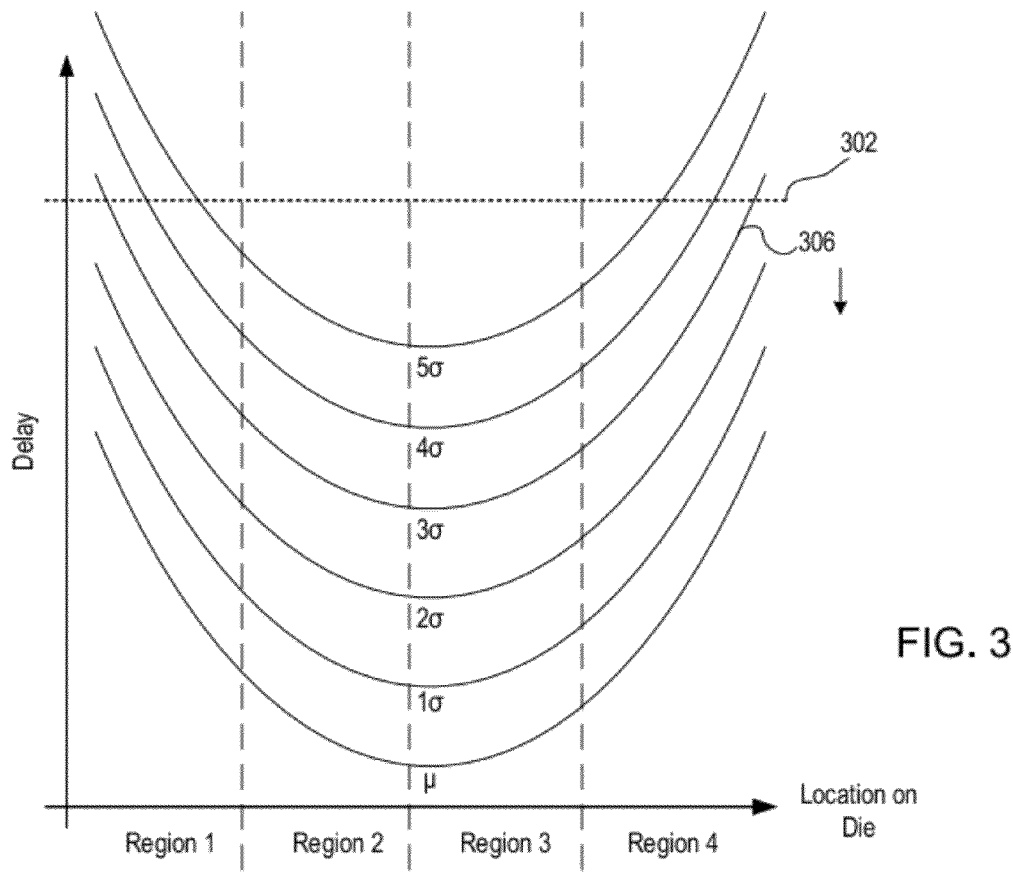
FIG. 3 illustrates several timing specifications across the cross-section I of the die illustrated in FIG. 1, the timing specifications corresponding to the mean delay and several standard deviations.

FIG. 3 shows an example graph representing delay values according to the cross-section (I) shown in FIG. 1. In a conventional performance guarantee, a single delay value is guaranteed for the entire silicon die as illustrated by dashed line 302. This is referred to as a uniform performance guarantee. In practice, the uniform performance guarantee is typically set about 3σ above the highest mean value, as shown. This approach ensures that 99.86 percent of circuit elements will have a delay parameter less than specified, regardless of location on the die. However, the uniform performance guarantee underestimates the performance within regions of the die that will operate with less delay. For example, if the assured quality level guarantee requires that no more than 0.1% (about 3σ above the mean) have a greater delay than indicated, elements in the second and third regions are capable of operating with delays less than that indicated by the uniform speed file. If the design is small enough to be implemented in the second and third regions, higher speeds may be promised while maintaining the 0.1% assured quality level.

The speedfile may indicate a guaranteed delay value that varies according to the location on the die. For example, the delay curve 306 may be used as a speedfile indicating the guaranteed performance across the cross-section (I) shown in FIG. 1 having headroom of 3σ. This equates to a timing yield of about 99.86 percent as indicated by Table 1. As used herein, this type of speedfile is referred to as a variation aware performance guarantee. Because different performance capabilities are indicated for different areas, a development tool may place and route a design to place elements of critical paths in regions of the die indicating a lower delay.

In one embodiment, two or more speedfiles may be used to analyze a design and determine which speedfile can guarantee a higher performance for a specified timing yield. Multiple speedfiles having the same timing yield are provided to a developer. A development tool analyzes each of the speedfiles to determine the speedfile having the highest performance for an indicated design.

Figure 4:
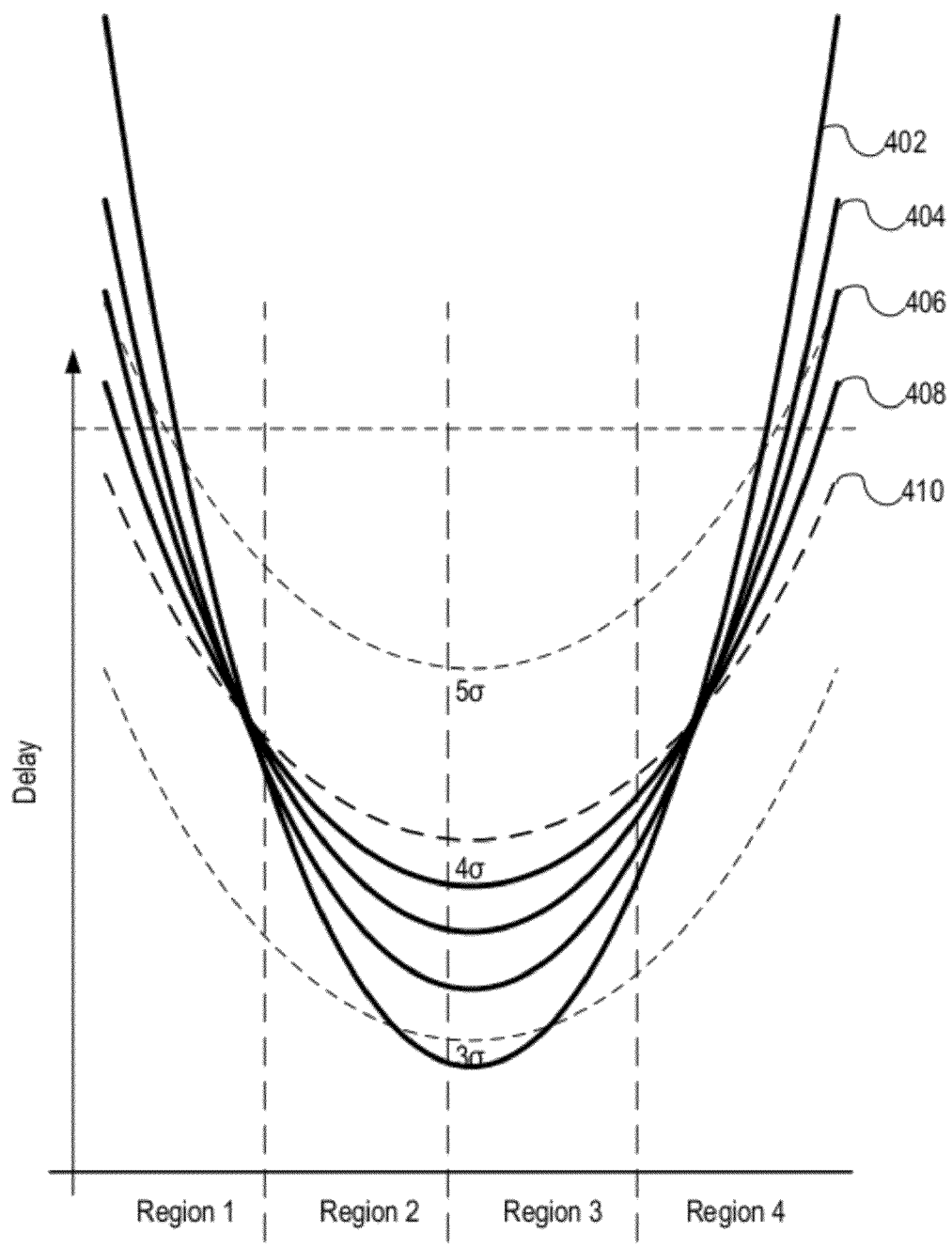
FIG. 4 illustrates several timing specifications corresponding to a target timing yield.

FIG. 4 shows a graph of four example speedfiles 402, 404, 406, and 408, which offer the same timing yield as the 3σ speedfile 410. These speedfiles illustrate that the minimum tolerated delay of a circuit design can be adjusted in different regions while maintaining a specified timing yield through adjustment of the speedfile. For example, speedfile 402, in comparison to speedfiles 404, 406, 408, and 410, has smaller delays in regions 2 and 3 and larger delays in regions 1 and 4.

For ease of illustration, FIG. 4 is limited to five symmetric speedfiles. It is understood that the speedfiles need not be symmetric as shown or limited in number. One skilled in the art will recognize that the plurality of speedfiles may include uniform and variation aware performance guarantees.

Figure 5:
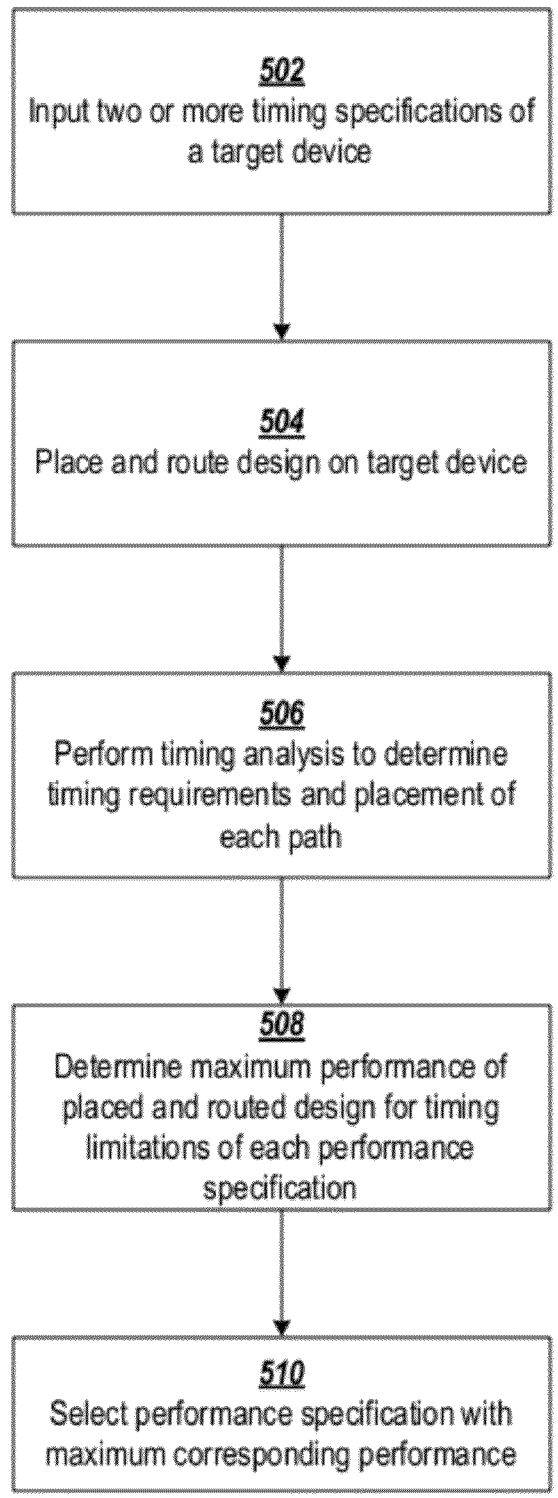
FIG. 5 shows a flowchart of an example process for generating a design specific timing specification by performing analysis on several timing specifications, such as those shown in FIG. 3.

FIG. 5 shows a flowchart of an example process for determining a performance guarantee customized for a specific circuit design. Two or more timing specifications of a target device are input. The design is placed and routed on the target device at step 504. Timing analysis is performed at step 506 to determine timing requirements and placement of each path. A maximum performance of the placed and routed design is determined for the timing limitations indicated by each of the timing specifications at step 508. The timing specification with the highest maximum performance is selected at step 510.

In some embodiments, the circuit design may be separately placed and routed for each of the timing specifications at step 504. Placement may be optimized to place critical elements in regions having the highest performance as indicated by the respective timing specification. Likewise, portions of the circuit design having high delay tolerance may be placed in regions having lower performance. In this manner, a designer can determine the best performance that can be promised for a specified timing yield.

In another embodiment, a timing specification indicated in a speedfile can be adjusted to reallocate timing yield between different regions of the silicon die by adjusting the headroom allocated in each region. The timing yield of the die according to the selected curve illustrated in FIG. 4 is the cumulative sum of the timing yield in each of the regions 1-4. Timing yield is given by the equation:

timing yield_yield=$1-\Sigma_{r=1}^{n} P(r)$, where P (r) is the probability of one or more elements in region r having delay parameters exceeding the delay of the performance guarantee. The cumulative probability of failure is the sum of the probabilities for all regions. For example, if a timing specification indicated the cumulative delay of the regions at three σ over the mean, the total probability of failure is approximately 0.00135, as shown in Table 1 (1−0.99865=0.00135).

Assuming that the probability of failure is evenly distributed, the probability of failure in each region of the device is approximately 0.000338 (0.00135/4=0.000338). However, the speedfile can be modified to have different probabilities of failure in different regions depending on the layout and requirements of a particular design while maintaining the same cumulative timing yield. For example, a placed design may not include any timing-critical circuit elements in region 1. Because no circuit elements in Region 1 are used, delay above the three σ mark in Region 1 will not result in failure of the design and the cumulative failure rate is reduced. Therefore, the actual design-specific cumulative probability of failure is 0.001012 (0.00135−0.000338=0.001012). Because the failure rate is reduced by 0.000338, the speedfile may be modified to decrease the delay in another region (and correspondingly increase the failure rate) while maintaining a cumulative probability of failure of 0.00135. For example, the delay parameters in region 4 can be reduced to a level that would increase the failure rate in that region to 0.00676 (0.000338+0.000338=0.00676). In this manner, the speedfile can be modified to allow critical paths to be clocked at higher speeds while maintaining the same timing yield.

This may allow a vendor to promise better performance for a specified timing yield, or may allow a customer to implement a design using a cheaper programmable IC having a lower performance than indicated in the uniform speedfile.

Figure 6:
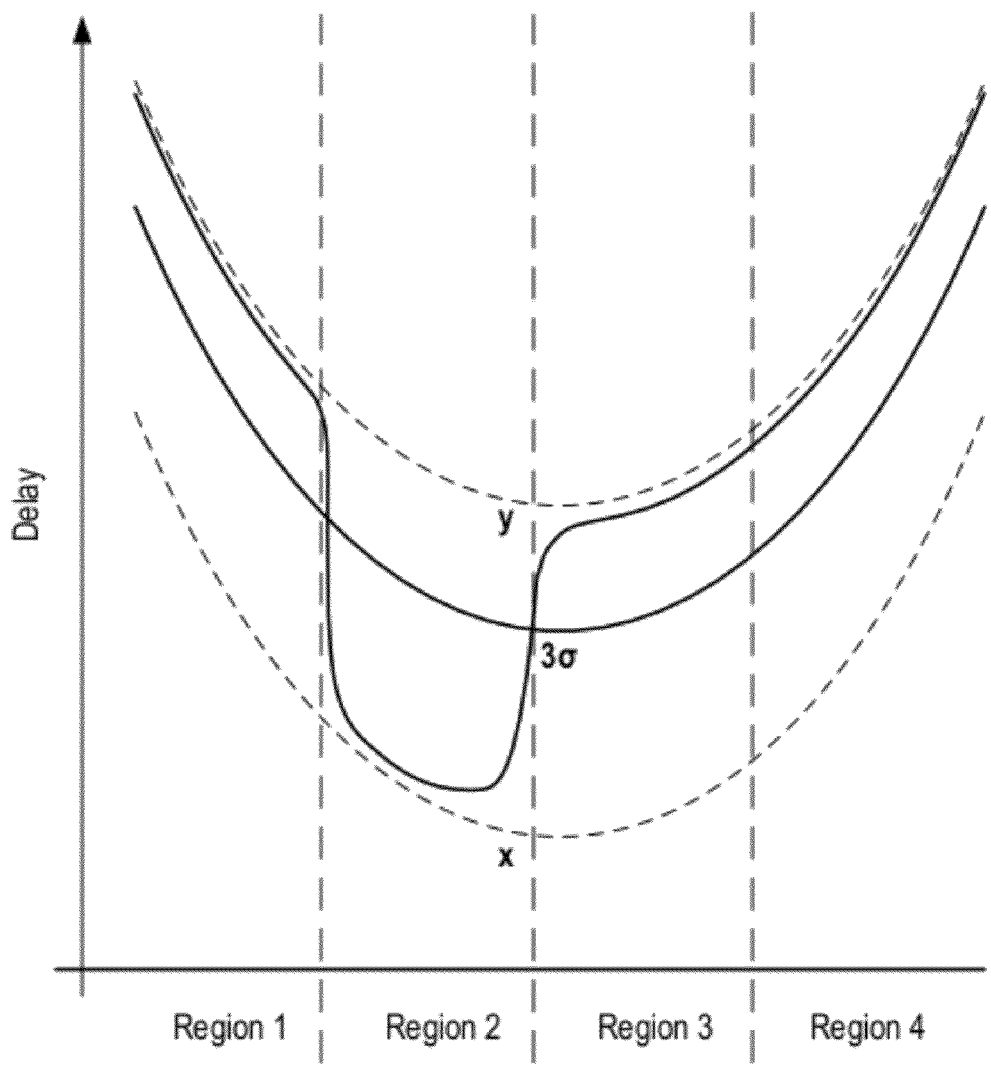
FIG. 6 shows a graph of a modified timing specification illustrating the generic adjustment of a variation aware timing specification which preserves the timing yield.

FIG. 6 illustrates the adjustment of a variation aware timing specification that preserves the timing yield. In this example, the timing delay in region 2 is decreased to a level x. Taken alone, this adjustment would result in a decrease in the overall timing yield. In order to preserve the same timing yield as the example three σ timing specification, the timing delay in another region must be increased. In this example, the timing delay in regions 1, 3, and 4 are increased to level y.

The change in the delay parameters of each region depends on the distribution within each region. For example, random variation may result in variation in the delay of a specific region from device to device. In a set of devices, the exhibited standard of deviation may be different in different regions. For example, in one region the variation of 100 ns from the mean delay may correspond to one σ. Whereas 100 ns delay in a second region, having a tighter grouping, may correspond to two σ of distribution.

The relative adjustment required in regions 1, 3, and 4 due to the adjustment in region 2 is given by:

$$\int_{x}^{3\sigma} \text{Distribution}(R_2) = \int_{3\sigma}^{y} \{\text{Distribution}(R_1) + \text{Distribution}(R_3) + \text{Distribution}(R_4)\}$$

where the area under the distribution curve Distribution ($R_2$) from x to 3σ indicates the decrease in timing yield due to the decrease in the delay parameters of region 2. In this example, the timing yield is uniformly increased in regions 1, 3, and 4 to compensate for the decrease in region 2.

Figure 7:
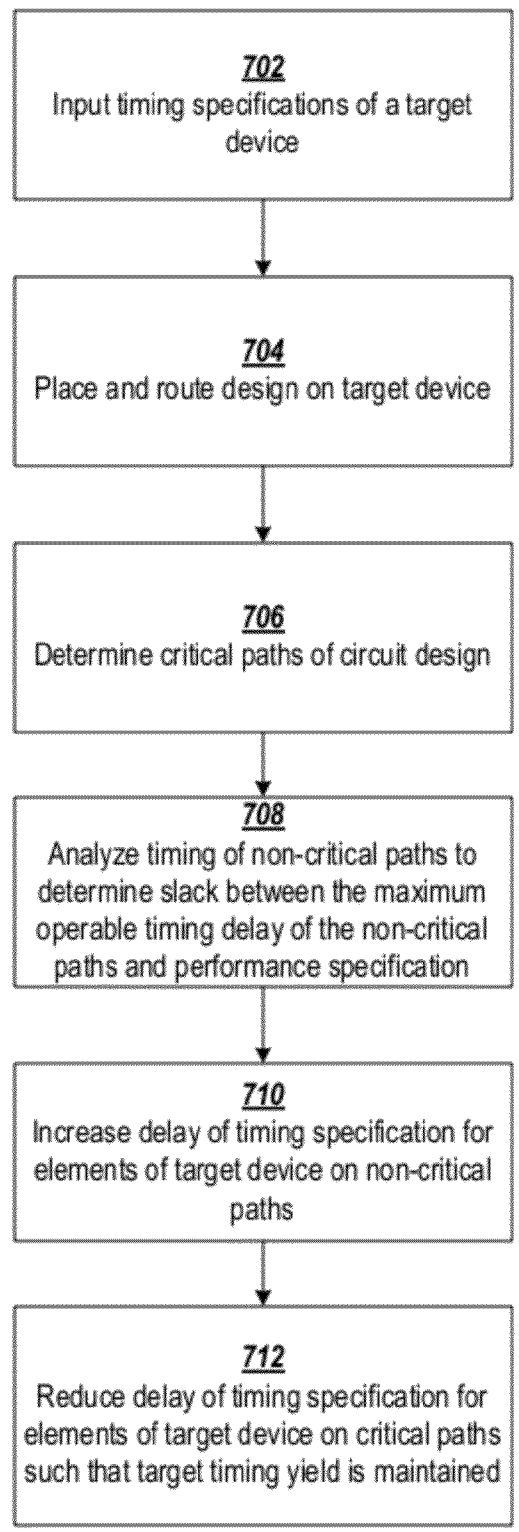
FIG. 7 shows a flowchart of an example process for generating a device specific performance specification by adjusting guaranteed performance parameters in various regions to improve performance of critical paths.

FIG. 7 shows a flowchart of an example process for design-specific adjustment of a timing specification. A timing specification of a target device is input at step 702. The design is placed and routed for the target device at step 704. Critical paths are determined at step 706. Non-critical paths are analyzed at step 708 to determine slack between the maximum operable timing delay of non-critical paths and the delays indicated by the timing specification. The maximum operable timing delay is the largest delay that produces correct output from the path. The delay of the timing specification for elements of target device on non-critical paths is increased at step 710. The delay of the timing specification for elements of target device on critical paths is reduced at step 712 such that the overall timing yield is maintained.

The various embodiments, may create design-specific performance guarantees for a circuit design implemented on a number of target devices. It is understood that the target device may be an application specific integrated circuit (ASIC), a memory device with multiple memory blocks, a programmable logic device such as an FPGA, or a microprocessor with multiple cores or execution units, for example.

Figure 8:
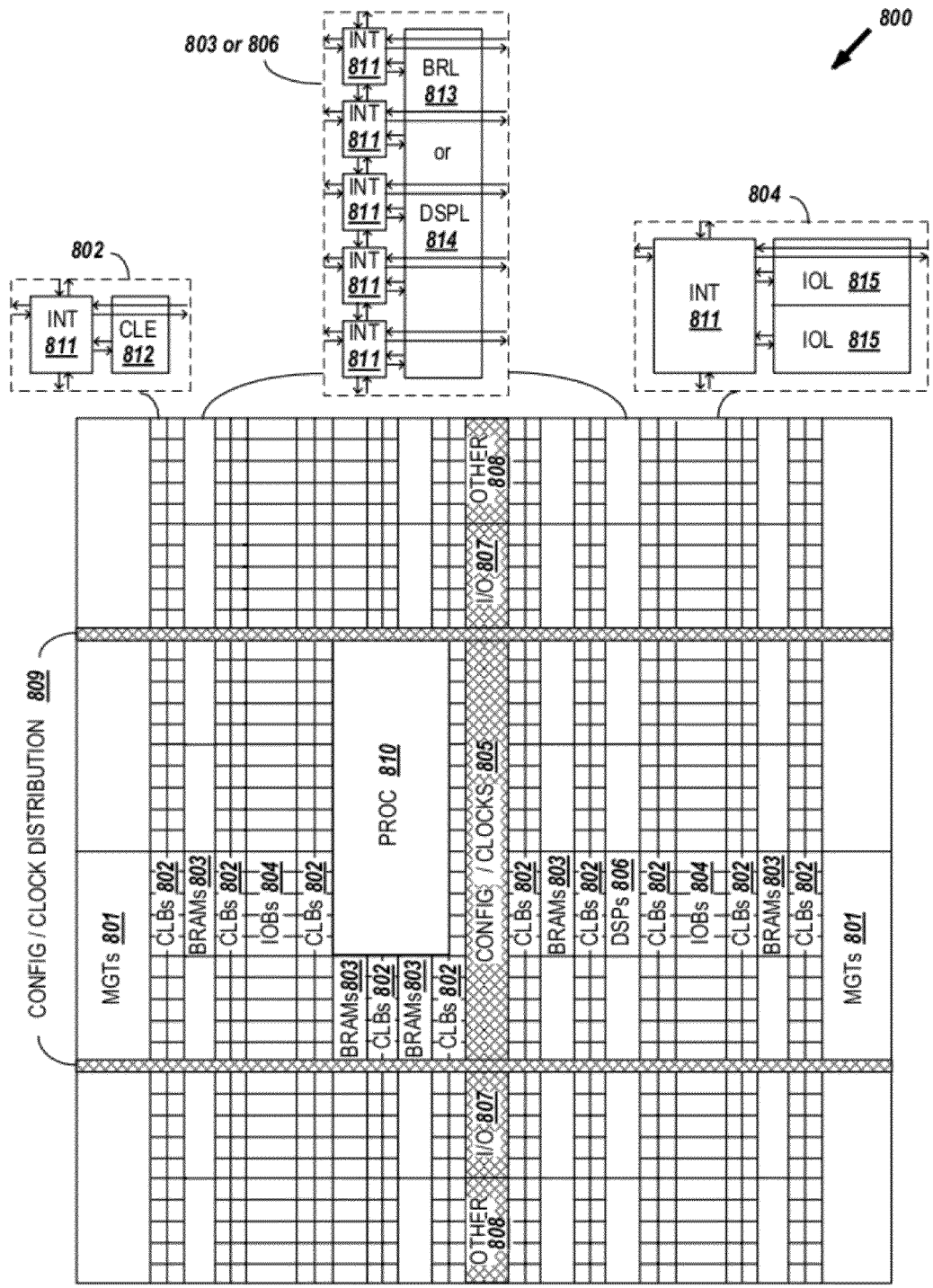
FIG. 8 illustrates a block diagram of a programmable integrated circuit for implementing a circuit design with programmable operating voltage.

FIG. 8 is a block diagram of an example programmable integrated circuit that may be used as a target device in accordance with many of the various embodiments described herein. FPGAs can include several different types of programmable logic blocks in the array. For example, FIG. 8 illustrates an FPGA architecture (800) that includes a large number of different programmable tiles including multi-gigabit transceivers (MGTs 801), configurable logic blocks (CLBs 802), random access memory blocks (BRAMs 803), input/output blocks (IOBs 804), configuration and clocking logic (CONFIG/CLOCKS 805), digital signal processing blocks (DSPs 806), specialized input/output blocks (I/O 807), for example, e.g., clock ports, and other programmable logic 808 such as digital clock managers, analog-to-digital converters, system monitoring logic, and so forth. Some FPGAs also include dedicated processor blocks (PROC 810) and internal and external reconfiguration ports (not shown).

In some FPGAs, each programmable tile includes a programmable interconnect element (INT 811) having standardized connections to and from a corresponding interconnect element in each adjacent tile. Therefore, the programmable interconnect elements taken together implement the programmable interconnect structure for the illustrated FPGA. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic plus a single programmable interconnect element INT 811. A BRAM 803 can include a BRAM logic element (BRL 813) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 806 can include a DSP logic element (DSPL 814) in addition to an appropriate number of programmable interconnect elements. An 10B 804 can include, for example, two instances of an input/output logic element (IOL 815) in addition to one instance of the programmable interconnect element INT 811. As will be clear to those of skill in the art, the actual I/O pads connected, for example, to the I/O logic element 815 are manufactured using metal layered above the various illustrated logic blocks, and typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic.

Figure 9:
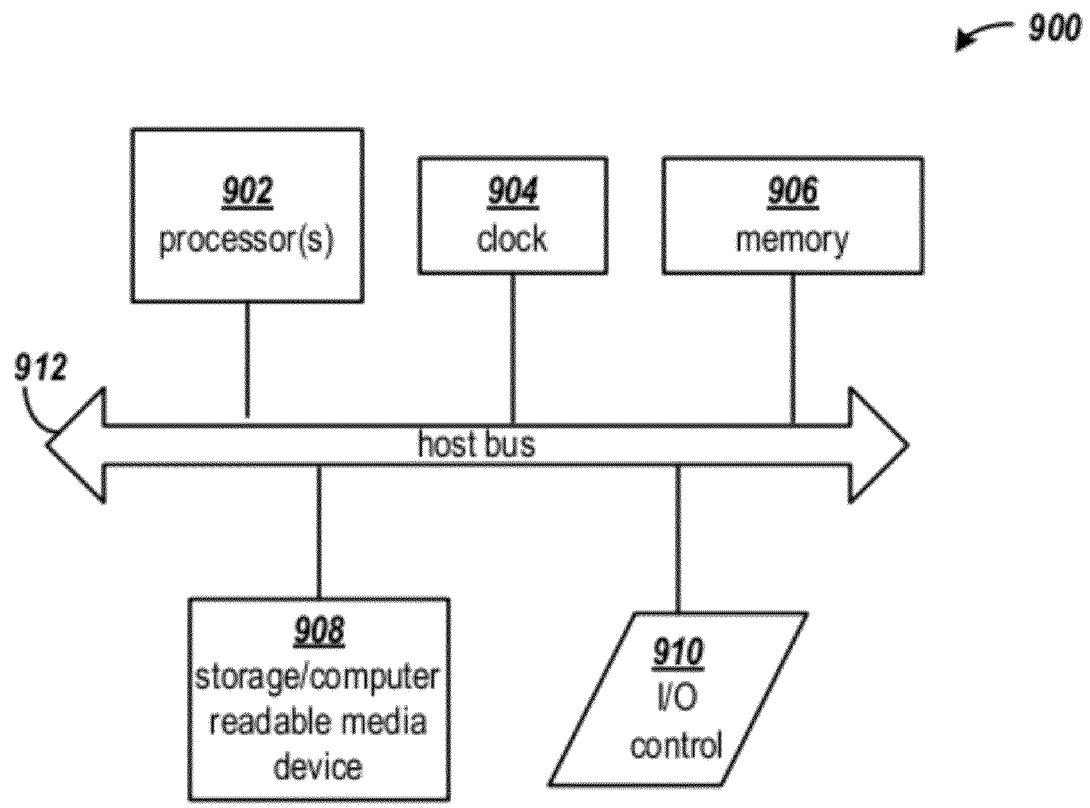
FIG. 9 illustrates a block diagram of a general purpose processor computing arrangement for implementing a data bus controller.

FIG. 9 is a block diagram of an example computing arrangement which may be configured to specifically perform the processes described herein using a general purpose processor. Those skilled in the art will appreciate that various alternative computing arrangements, including one or more processors and a memory arrangement configured with program code, would be suitable for hosting the processes and data structures and implementing the methods described herein. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 900 includes one or more processors 902, a clock signal generator 904, a memory unit 906, a storage unit 908, and an input/output control unit 910 coupled to host bus 912. The arrangement 900 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 902 may be one or more general purpose processors, or a combination of one or more general purpose processors and suitable co-processors, or one or more specialized processors (e.g., RISC, CISC, pipelined, etc.).

The memory arrangement 906 typically includes multiple levels of cache memory and a main memory. The storage arrangement 908 may include local and/or remote persistent storage such as provided by magnetic disks (not shown), flash, EPROM, or other non-volatile data storage. The storage unit may be read or read/write capable. Further, the memory 906 and storage 908 may be combined in a single arrangement.

The processor arrangement 902 executes the software in storage 908 and/or memory 906 arrangements, reads data from and stores data to the storage 908 and/or memory 906 arrangements, and communicates with external devices through the input/output control arrangement 910. These functions are synchronized by the clock signal generator 904. The resource of the computing arrangement may be managed by either an operating system (not shown), or a hardware control unit (not shown).

The present invention is thought to be applicable to a variety of performance guarantee data formats indicating parameters for a variety of devices and circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for determining a design-specific timing specification for elements of a target device, comprising:
   inputting a placed-and-routed circuit design for a target device;
   inputting a timing specification of delays for elements in different regions of the target device;
   inputting an expected timing yield corresponding to the timing specification for a plurality of the target device;
   wherein the expected timing yield is a first proportion of a total number of the plurality of the target device having all elements that satisfy the timing specification;
   determining with a programmed processor a design-specific timing yield for the placed-and-routed circuit design as a function of amounts by which the delays of the timing specification are less than required delays of paths of the design;
   wherein the design-specific timing yield is an expected second proportion of a total number of the plurality of the target device that, when configured with the circuit design, have all elements satisfying the timing specification;

selecting a path of the circuit design that uses elements in a first one of the regions; and reducing respective delays of a first set of one or more elements in the timing specification by respective amounts that maintain the design-specific timing yield at a level greater than or equal to the expected timing yield to produce a design-specific timing specification, the one or more timing elements being on the selected path in the first region.

2. The method of claim 1, wherein the selecting a path of the circuit design that is in the first one of the regions includes:

determining one or more critical paths of the circuit design; and selecting one of the one or more critical paths of the circuit design that is in the first one of the regions.

3. The method of claim 1, further comprising increasing respective delays of a second set of one or more elements in the timing specification, wherein:

the increase in respective delays of the second set of one or more elements compensates for a reduction in the design-specific timing yield resulting from the reduction in delays of the first set of one or more elements; and the second set of one or more elements is located in a second region of the target device.

4. The method of claim 3, wherein the second set of one or more elements is located on non-critical paths of the circuit design.

5. The method of claim 3, wherein the circuit design is not placed on elements included in the second set of one or more elements.

6. A processor computing arrangement for determining a design-specific timing specification for elements of a target device, comprising:

a memory arrangement; and a processor coupled to the memory arrangement, the memory arrangement configured with program code that when executed by the processor causes the processor to perform operations comprising:

inputting a placed-and-routed circuit design for the target device;

inputting a timing specification of delays for elements in different regions of the target device;

inputting an expected timing yield corresponding to the timing specification for a plurality of the target device;

wherein the expected timing yield is a first proportion of a total number of the plurality of the target device having all elements that satisfy the timing specification;

determining with a programmed processor a design-specific timing yield for the placed-and-routed circuit design as a function of amounts by which the delays of the timing specification are less than required delays of paths of the design;

wherein the design-specific timing yield is an expected second proportion of a total number of the plurality of the target device that, when configured with the circuit design, have all elements satisfying the timing specification;

selecting a path of the circuit design that uses elements in a first one of the regions; and reducing respective delays of a first set of one or more elements in the timing specification by respective amounts that maintain the design-specific timing yield at a level greater than or equal to the expected timing yield to produce a design-specific timing specification, the one or more timing elements being on the selected path in the first region.

7. The processor computing arrangement of claim 6, wherein the selecting a path of the circuit design that is in the first one of the regions includes:

determining one or more critical paths of the circuit design; and selecting one of the one or more critical paths of the circuit design that is in the first one of the regions.

8. The processor computing arrangement of claim 6, wherein the operations further comprise increasing respective delays of a second set of one or more elements in the timing specification, wherein:

the increase in respective delays of the second set of one or more elements compensates for a reduction in the design-specific timing yield resulting from the reduction in delays of the first set of one or more elements; and the second set of one or more elements is located in a second region of the target device.

9. The processor computing arrangement of claim 8, wherein the second set of one or more elements is located on non-critical paths of the circuit design.

10. The processor computing arrangement of claim 8, wherein the circuit design is not placed on elements included in the second set of one or more elements.

11. An article of manufacture, comprising:

a non-transitory processor-readable storage device storing processor-executable code for determining a design-specific timing specification for elements of a target device, the processor-executable code comprising instructions that when executed by a processor cause the processor to perform operations comprising:

inputting a placed-and-routed circuit design for the target device;

inputting a timing specification of delays for elements in different regions of the target device;

inputting an expected timing yield corresponding to the timing specification for a plurality of the target device;

wherein the expected timing yield is a first proportion of a total number of the plurality of the target device having all elements that satisfy the timing specification;

determining with a programmed processor a design-specific timing yield for the placed-and-routed circuit design as a function of amounts by which the delays of the timing specification are less than required delays of paths of the design;

wherein the design-specific timing yield is an expected second proportion of a total number of the plurality of the target device that, when configured with the circuit design, have all elements satisfying the timing specification;

selecting a path of the circuit design that uses elements in a first one of the regions; and reducing respective delays of a first set of one or more elements in the timing specification by respective amounts that maintain the design-specific timing yield at a level greater than or equal to the expected timing yield to produce a design-specific timing specification, the one or more timing elements being on the selected path in the first region.

12. The article of manufacture of claim 11, wherein the selecting a path of the circuit design that is in the first one of the regions includes:

determining one or more critical paths of the circuit design; and selecting one of the one or more critical paths of the circuit design that is in the first one of the regions.

13. The article of manufacture of claim 11, wherein the operations further comprise increasing respective delays of a second set of one or more elements in the timing specification, wherein:
- the increase in respective delays of the second set of one or more elements compensates for a reduction in the design-specific timing yield resulting from the reduction in delays of the first set of one or more elements; and
- the second set of one or more elements is located in a second region of the target device.

14. The article of manufacture of claim 13, wherein the second set of one or more elements is located on non-critical paths of the circuit design.

15. The article of manufacture of claim 13, wherein the circuit design is not placed on elements included in the second set of one or more elements.

* * * * *